United States Patent
Chang

(10) Patent No.: US 8,696,218 B2
(45) Date of Patent: Apr. 15, 2014

(54) OPTOELECTRONIC SIGNAL CONVERSION MODULE

(76) Inventor: Nai-Chien Chang, New Taipei (TW)

(*) Notice: Subject to any disclaimer, the term of this patent is extended or adjusted under 35 U.S.C. 154(b) by 155 days.

(21) Appl. No.: 13/486,952

(22) Filed: Jun. 1, 2012

(65) Prior Publication Data

US 2013/0051737 A1 Feb. 28, 2013

(30) Foreign Application Priority Data

Aug. 29, 2011 (TW) .............................. 100216075 U

(51) Int. Cl.
*G02B 6/36* (2006.01)

(52) U.S. Cl.
USPC ............................................. 385/92; 385/89

(58) Field of Classification Search
USPC ....................................................... 385/89, 92
See application file for complete search history.

(56) References Cited

U.S. PATENT DOCUMENTS

2011/0311187 A1* 12/2011 Wang et al. ..................... 385/78

* cited by examiner

*Primary Examiner* — Uyen Chau N Le
*Assistant Examiner* — Kajli Prince
(74) *Attorney, Agent, or Firm* — Chun-Ming Shih; HDLS IPR Services

(57) ABSTRACT

An optoelectronic signal conversion module includes a female terminal and a male terminal and contains a printed circuit board, a plurality of connection terminals, a signal conversion integrated circuit and an optical fiber transmission connector electrically connected to the printed circuit board. The female terminal is provided for plugging a male plug of the transmission line; the connection terminals are electrically connected to the transmission line for receiving an electric signal; the signal conversion integrated circuit converts the received electric signal into an optical signal of the same specification; and the male terminal is plugged to a socket of an optical connector for transmitting the converted optical signal to an optical component of the optical connector and to the outside through the optical connector. The optoelectronic signal conversion module converts an electric signal of a specification into an optical signal of the same specification to overcome hardware compatibility issues.

10 Claims, 12 Drawing Sheets

OPTOELECTRONIC SIGNAL CONVERSION MODULE

FIELD OF THE INVENTION

The present invention relates to a signal conversion module, in particular to the signal conversion module capable of converting electric signals and optical signals with one another.

BACKGROUND OF THE INVENTION

As the electronic industry blooms, various electronic devices are introduced to the market and used extensively in our daily life. To input instructions to control and operate the electronic devices or transmit data between the electronic devices, most electronic devices come with a plurality of connectors installed on a motherboard.

At present, each of the popular personal computers has a plurality of connectors on the motherboard, and these connectors include Universal Serial Bus (USB) connectors, External Serial Advance Technology Attachment (e-SATA) connectors, RJ-45 connectors, and High Definition Multimedia Interface (HDMI) connectors. By connecting a transmission line to an external control device to receive control instructions or connecting the transmission line with another electronic device, data can be transmitted between several electronic devices.

Since science and technology bloom and users have increasingly higher demand on data transmission speed, the transmission speed of conventional electric connectors can no longer satisfy user requirements anymore. Therefore, new electric connectors and corresponding transmission lines are developed and available in the market. In addition to the present existing transmission terminals inside the electric connector, one or more optical fiber transmission connectors are added to improve the transmission speed. Further, an optical connector and a corresponding optical fiber cable are developed and available in the market. The conventional copper wires and connection terminals are abandoned, and just the optical fiber transmission connector and the optical components are used for transmitting data instead. Obviously, it is not difficult to imagine that future connectors and transmission lines will have different appearances only, and their interiors can adopt the optical fiber transmission connectors and optical components to transmit signals of different specifications quickly.

However, if a user wants to transmit a signal of a specific specification (such as a signal of the RJ-45 specification) from an electronic device, it is difficult to determine whether the user will use the conventional transmission line to transmit the electric signal of the specification or use the optical fiber cable to transmit the optical signal of the specification. To assure the user can transmit the electric signal of the RJ-45 specification or the optical signal of the RJ-45 specification, the motherboard of the electronic device must have both electric and optical connectors of the RJ-45 specification at the same time, and thus more precious space of the motherboard will be occupied.

In addition, if the several connectors of different specifications are required on a motherboard and these specifications require the installation of at least one electric connector and at least one optical connector simultaneously, then the space on the motherboard will be insufficient for such purpose.

Therefore, a solution without requiring the installation of too-many connectors on the motherboard is needed, so that users can flexibly and selectively transmit signals in form of electric signals or optical signals.

SUMMARY OF THE INVENTION

Therefore, it is a primary objective of the present invention to provide an optoelectronic signal conversion module capable of converting an electric signal of a specification into an optical signal of the same specification as well as converting the optical signal into an electric signal of the same specification.

To achieve the aforementioned objective, the present invention provides an optoelectronic signal conversion module with a female terminal and a male terminal, and comprises a printed circuit board installed therein, and a plurality of connection terminals, a signal conversion integrated circuit and an optical fiber transmission connector electrically coupled to the printed circuit board. The female terminal is provided for plugging and connecting a male plug on the transmission line, and the plurality of connection terminals and the transmission line are electrically coupled to one another for receiving an electric signal, and the signal conversion integrated circuit converts the received electric signal into an optical signal of the same specification. The male terminal is plugged and connected to a socket of an optical connector, and the converted optical signal is transmitted to an optical component of the optical connector and then transmitted to the outside through the optical connector.

Compared with the prior art, the present invention has the following advantages and effects. Users can use a general transmission line to transmit an electric signal of a certain specification and convert the electric signal into an optical signal of the same specification, and then the optical connector transmits the optical signal to the motherboard, and an electric connector and an optical connector of the same specification are installed on the motherboard at the same time to save precious space on the motherboard. When a user needs to transmit signals of the specification, a general transmission line can be used to transmit an electric signal, and the optoelectronic signal conversion module is used to convert the electric signal into an optical signal, or an optical fiber transmission line can also be used to transmit the optical signal, so as to improve the convenience of use.

DESCRIPTION OF THE PREFERRED EMBODIMENTS

Figure 1:
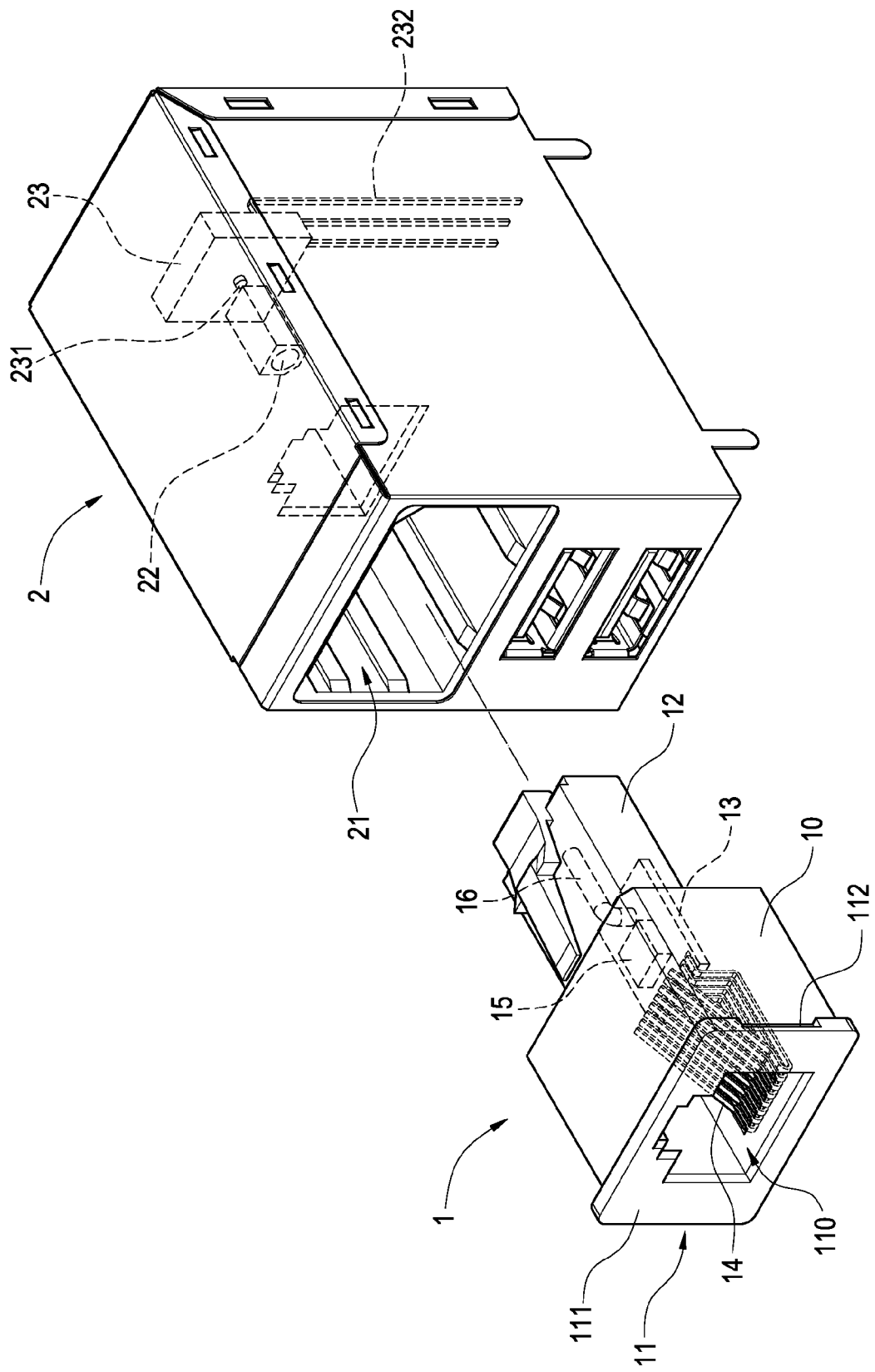
FIG. 1 is a perspective exploded view of a first preferred embodiment of the present invention.
Figure 2:
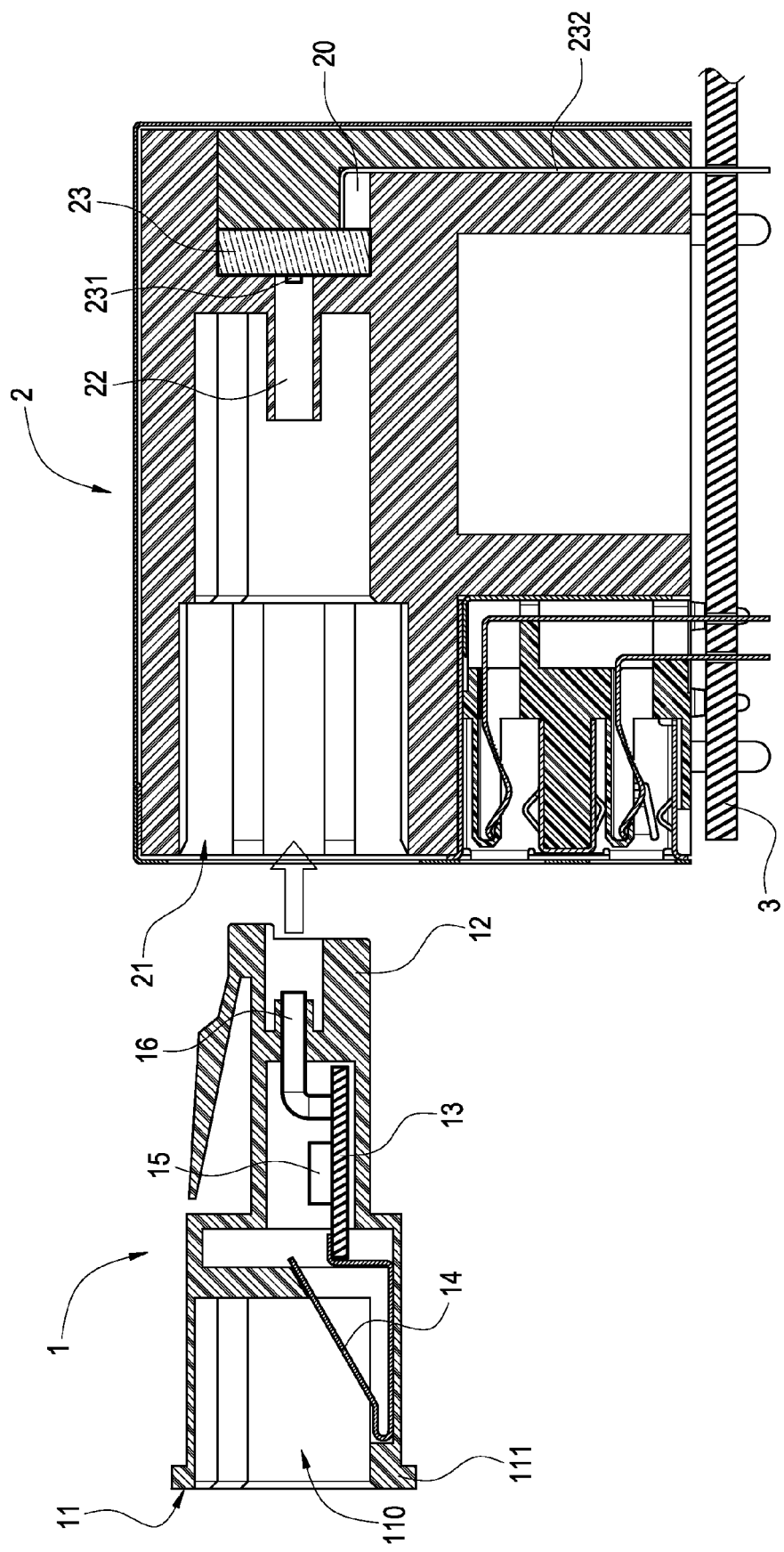
FIG. 2 is a cross-sectional exploded view of the first preferred embodiment of the present invention.

With reference to FIGS. 1 and 2 for a perspective exploded view and a cross-sectional exploded view of the first preferred embodiment of the present invention respectively, the present invention provides an optoelectronic signal conversion module 1 (hereinafter referred to as the "conversion module 1") for plugging and connecting an optical connector 2 to transmit an optical signal to the optical connector 2. Wherein, the optical connector 2 is electrically coupled to a motherboard 3 of an electronic device (not shown in the figure) for transmitting the optical signal to the motherboard 3 externally, or receiving the optical signal by the motherboard 3.

The optical connector 2 includes a socket 21 inwardly formed on a front end surface of the optical connector 2, and the optical connector 2 has a containing space 20 formed therein and interconnected to the socket 21 through a through slot 22, and an optical component 23 is installed in the containing space 20. The optical component 23 has a light transceiver portion 231 and a plurality of solder terminals 232, and the light transceiver portion 231 is disposed at a position corresponding to the through slot 22, so that the optical connector 2 can receive an optical signal from the light transceiver portion 231 of the optical component 23, and the optical connector 2 is electrically coupled to the motherboard 3 through the plurality of solder terminals 232.

The conversion module 1 comprises a casing 10, and the casing 10 comprises a female terminal 11 and a male terminal 12 disposed at a remote end of the female terminal 11. The casing 10 contains a printed circuit board 13, a plurality of connection terminals 14, a signal conversion integrated circuit (IC) 15, and an optical fiber transmission connector 16 installed therein, wherein the printed circuit board 13 is electrically coupled to the plurality of connection terminals 14, the signal conversion IC 15, and the optical fiber transmission connector 16. More specifically, the connection terminals 14 are electrically coupled to the printed circuit board 13 and disposed on a side proximate to the female terminal 11; the optical fiber transmission connector 16 is electrically coupled to the printed circuit board 13 and disposed on a side proximate to the male terminal 12; the signal conversion IC 15 is electrically coupled to the printed circuit board 13 and disposed at a middle position between the plurality of connection terminals 14 and the optical fiber transmission connector 16, but the invention is not limited to such arrangements only.

Figure 3:
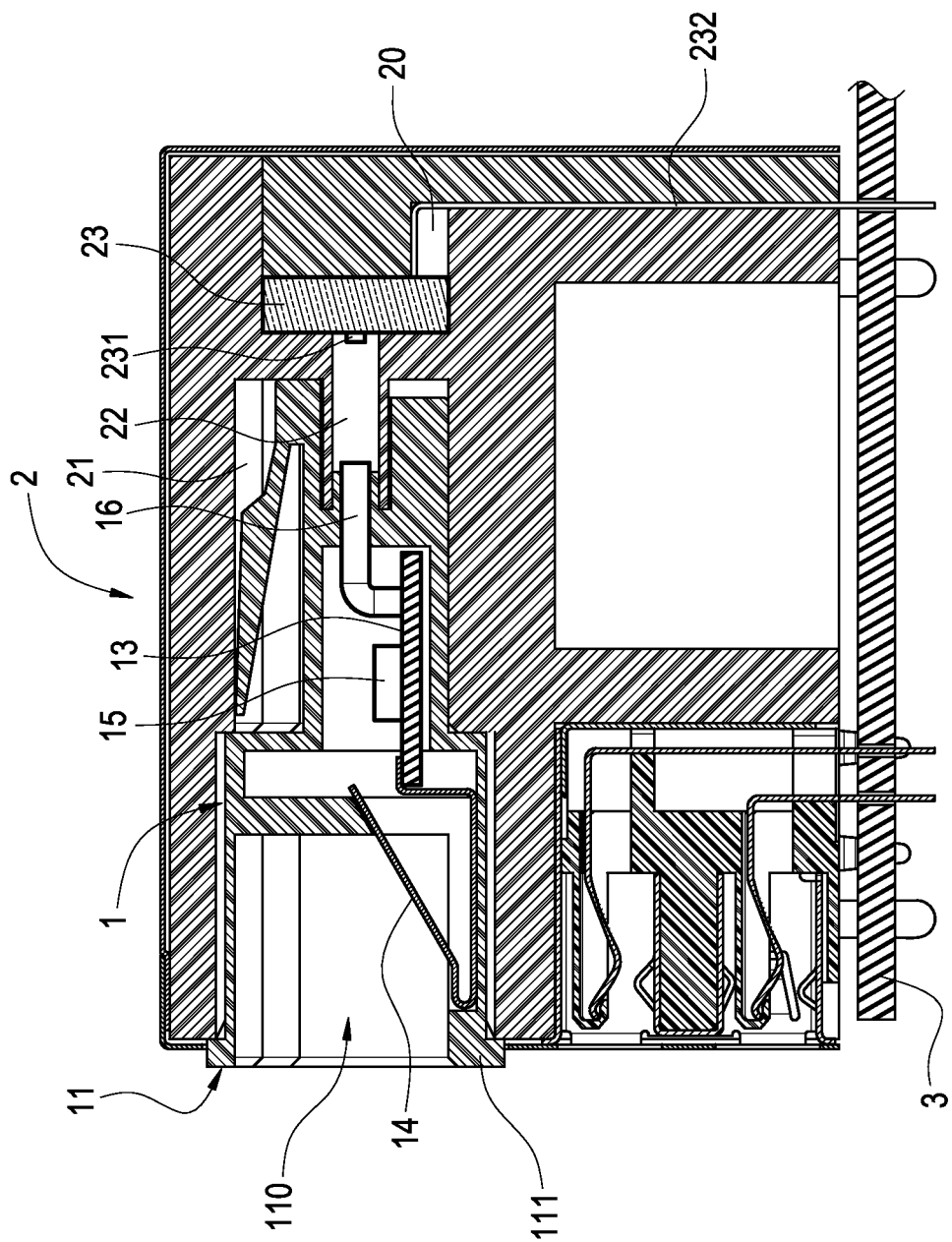
FIG. 3 is a perspective cross-sectional exploded view of the first preferred embodiment of the present invention.
Figure 4:
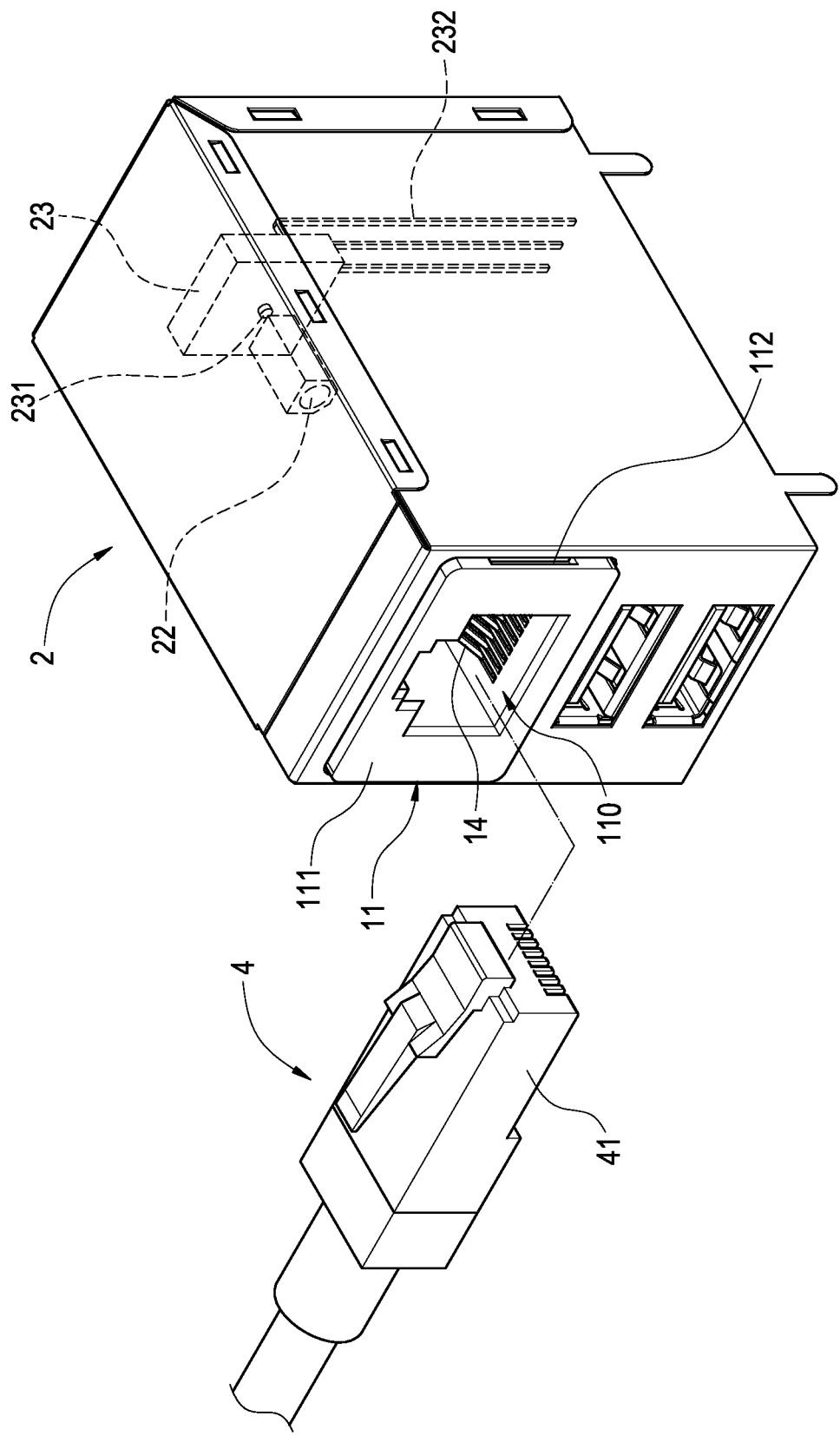
FIG. 4 is a perspective view of the first preferred embodiment of the present invention.

With reference to FIGS. 3 and 4 for a cross-sectional exploded view and a perspective view of the first preferred embodiment of the present invention respectively, the conversion module 1 is plugged and connected to the optical connector 2 through the male terminal 12 of the casing 10 for transmitting an optical signal. More specifically, the male terminal 12 is plugged and connected to the socket 21 of the optical connector 2, so that the optical fiber transmission connector 16 has the through slot 22 of the optical connector 2 aligned opposite to the light transceiver portion 231 of the optical component 23 for transmitting optical signals with one another.

A jack 110 is inwardly formed on the end surface 111 of the female terminal 11 and provided for plugging and connecting a male plug 41 of an external transmission line 4, and the transmission line 4 is electrically coupled to the plurality of connection terminals 14 in the conversion module 1, so that the conversion module 1 and the transmission line 4 can be used for transmitting an electric signal of a specific specification. The conversion module 1 uses the signal conversion IC 15 to convert the received electric signal into an optical signal of the same specification. In FIG. 4, the transmission line 4 is a network cable, and the conversion module 1 is electrically coupled to the transmission line 4 through the plurality of connection terminals 14 to transmit an electric signal of the RJ-45 specification and convert the electric signal of the RJ-45 specification into an optical signal of the RJ-45 specification through the signal conversion IC 15. However, the foregoing preferred embodiment is provided for the purpose of illustrating the present invention only, but the invention is not limited to such arrangements only.

In this preferred embodiment, the female terminal 11 and the male terminal 12 on the casing 10 are a female plug and a male plug of the same specification respectively. In FIGS. 1 to 4, the female terminal 11 and the male terminal 12 on the casing 10 correspond to connectors of the RJ-45 specification, and the quantity of connection terminals 14 corresponds to the quantity of connectors of the RJ-45 specification which is equal to eight in this preferred embodiment.

If a user wants to use the transmission line 4 to transmit an electric signal of the RJ-45 specification, then the user can plug and connect the transmission line 4 to the conversion module 1 of the present invention to convert the electric signal of the RJ-45 specification into an optical signal of the RJ-45 specification and then transmit the optical signal to the optical connector 2. If the user wants to use an optical transmission line (not shown in the figure) to transmit an optical signal of the RJ-45 specification, the user can plug and connect the optical fiber transmission line to the socket 21 of the optical connector 2 to transmit the optical signal directly. With the conversion module 1 of the present invention, users no longer need to have both of the electric connector and the optical connector of the RJ-45 specification installed on the motherboard 3, and thus saving the precious space of the motherboard 3.

The end surface 111 of the female terminal 11 of the conversion module 1 is slightly greater than an opening of the socket 21 of the optical connector 2, so that when the conversion module 1 is plugged and connected to the optical connector 2, the end surface 111 of the female terminal 11 is protruded outside the socket 21. For convenience, at least one notch 112 is selectively formed on both sides of the end surface 111 of the female terminal 11, so that when the conversion module 1 is plugged and connected to the optical connector 2, the users can remove the conversion module 1 from the socket 21 of the optical connector 2 through the notch 112.

Figure 5:
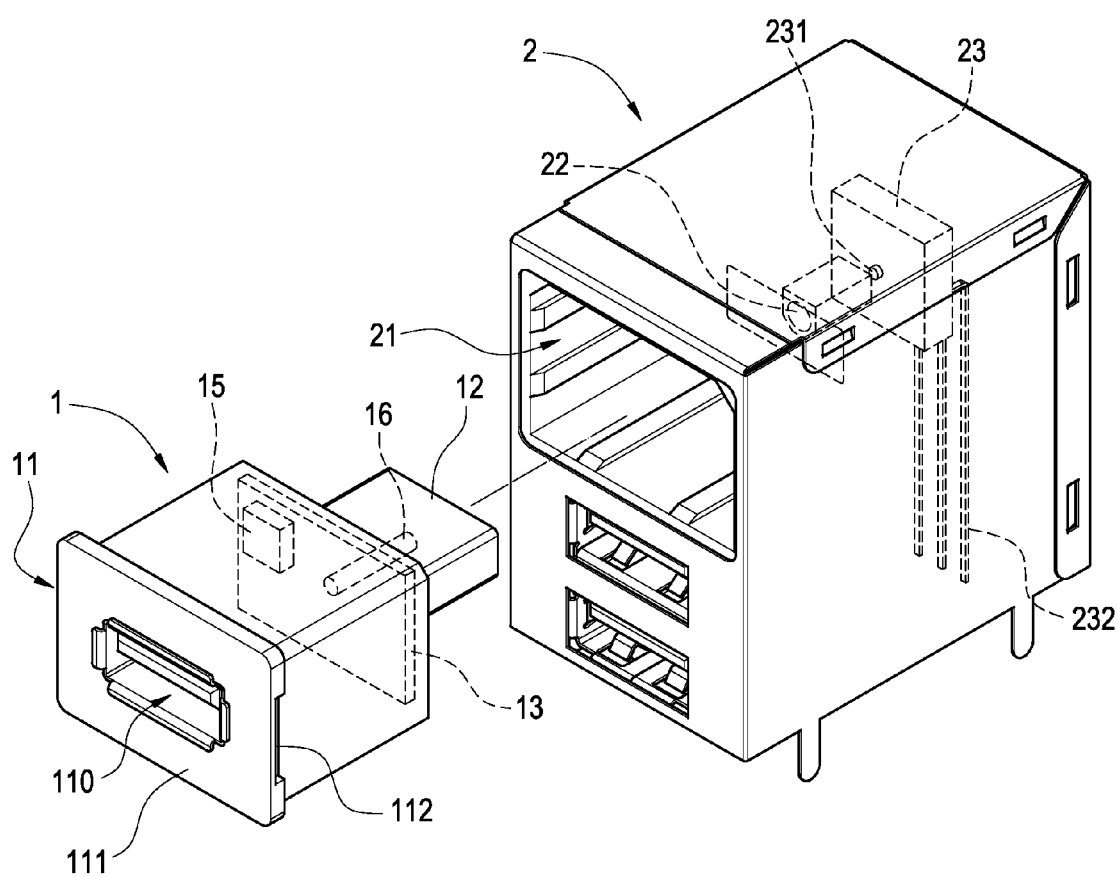
FIG. 5 is a perspective exploded view of a second preferred embodiment of the present invention.
Figure 6:
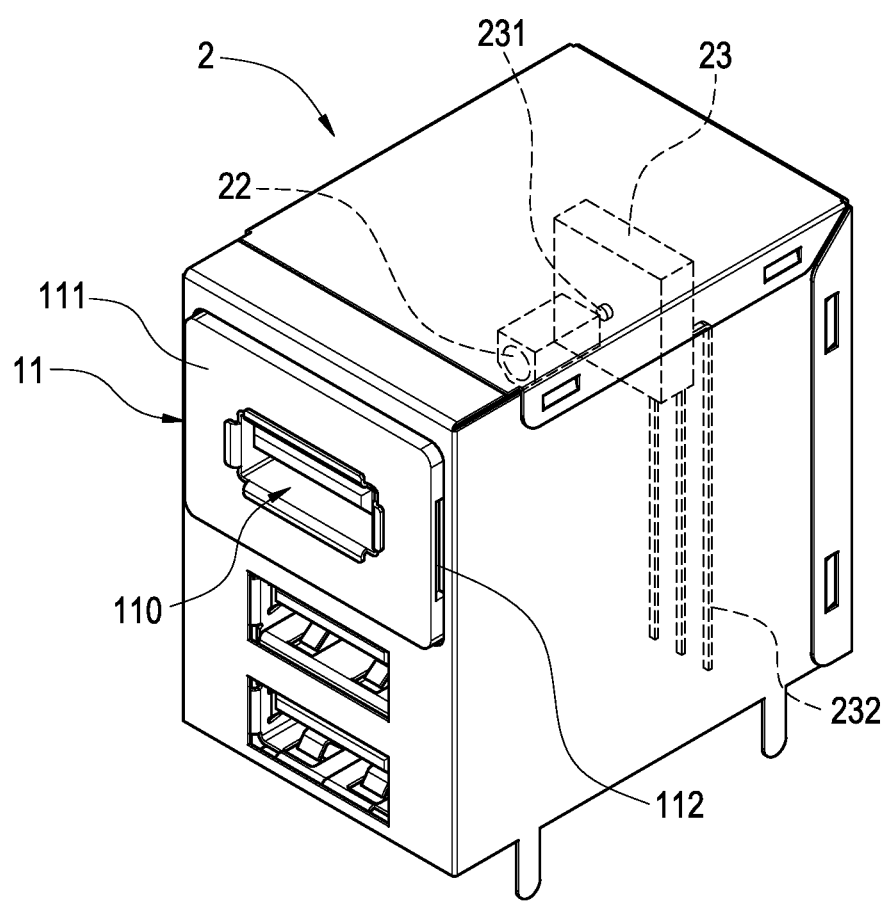
FIG. 6 is a perspective view of the second preferred embodiment of the present invention.

With reference to FIGS. 5 and 6 for a perspective exploded view and a perspective view of the second preferred embodiment of the present invention respectively, the female terminal 11 and the male terminal 12 of the casing 10 of this preferred embodiment correspond to connectors of the Universal Serial Bus (USB) specification, and the quantity of connection terminals 14 corresponds to the quantity of the connectors of the USB specification including four (USB 2.0) connectors or nine (USB 3.0) connectors. The conversion module 1 is electrically coupled to a USB transmission line for receiving an electric signal of the USB specification and converting the electric signal into an optical signal of the USB specification, and then transmitting the optical signal to the corresponding optical connector 2.

Figure 7:
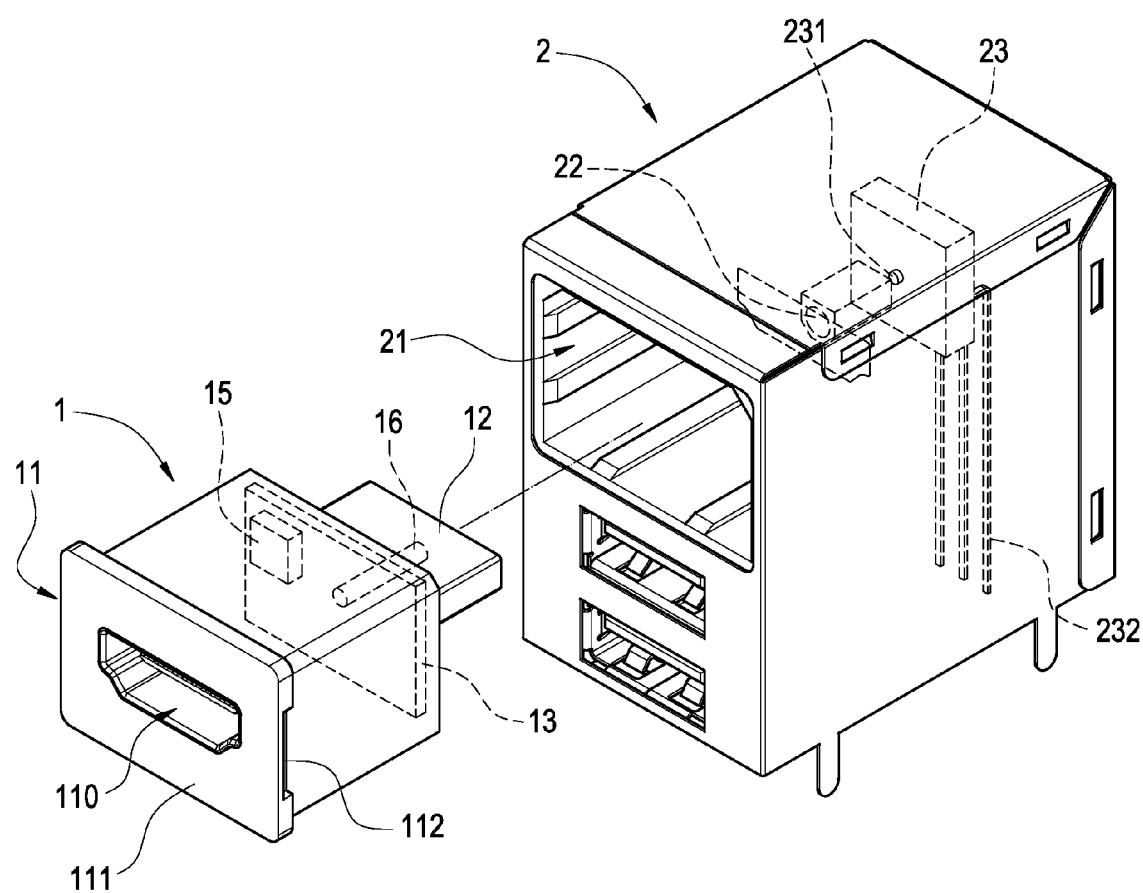
FIG. 7 is a perspective exploded view of a third preferred embodiment of the present invention.
Figure 8:
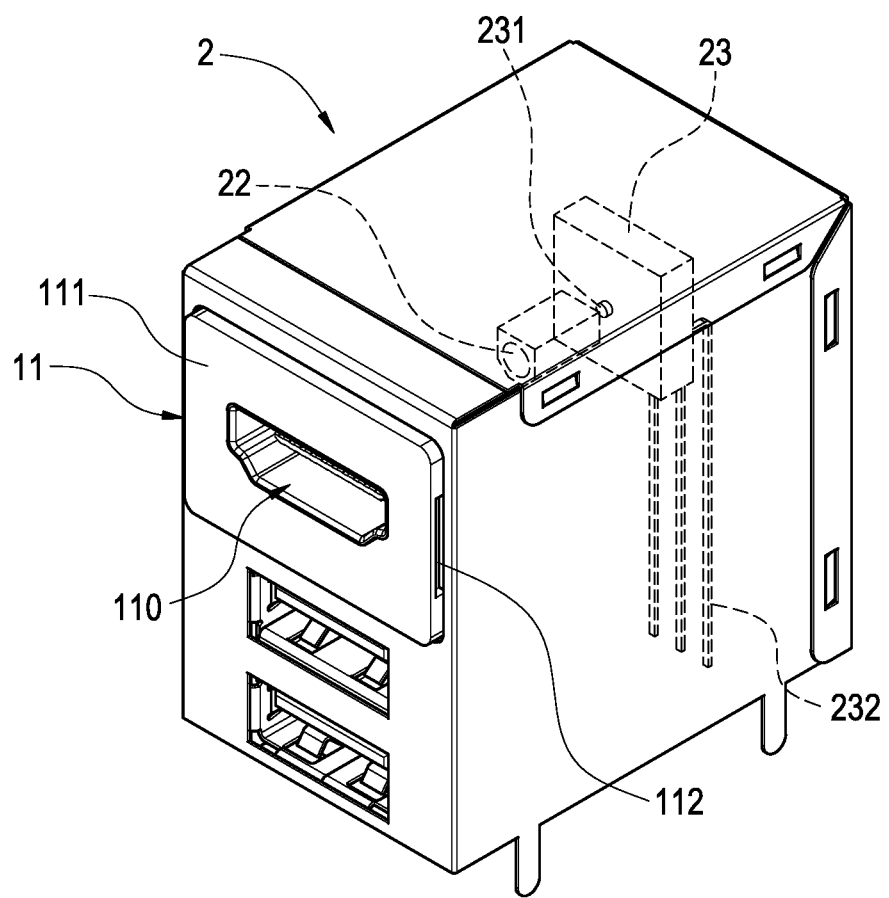
FIG. 8 is a perspective view of the third preferred embodiment of the present invention.

With reference to FIGS. 7 and 8 for a perspective exploded view and a perspective view of the third preferred embodiment of the present invention respectively, the female terminal 11 and the male terminal 12 of the casing 10 of this preferred embodiment correspond to connectors of the High Definition Multimedia Interface (HDMI) specification, and the quantity of connection terminals 14 corresponds to the quantity of HDMI connectors which is equal to 19. The conversion module 1 is electrically coupled to a HDMI transmission line for receiving an electric signal of the HDMI specification and converting the electric signal into an optical signal of the HDMI specification, and then transmitting the optical signal to the corresponding optical connector 2.

Figure 9:
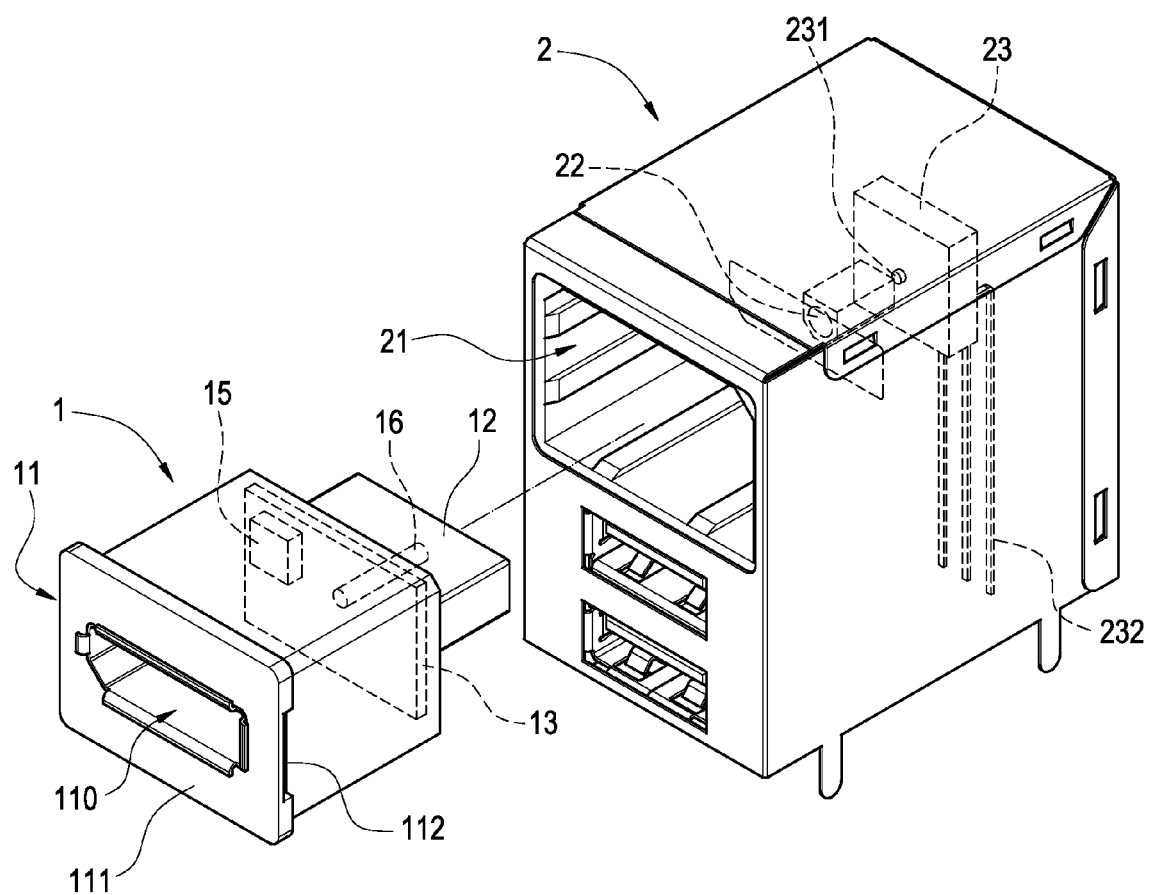
FIG. 9 is a perspective exploded view of a fourth preferred embodiment of the present invention.
Figure 10:
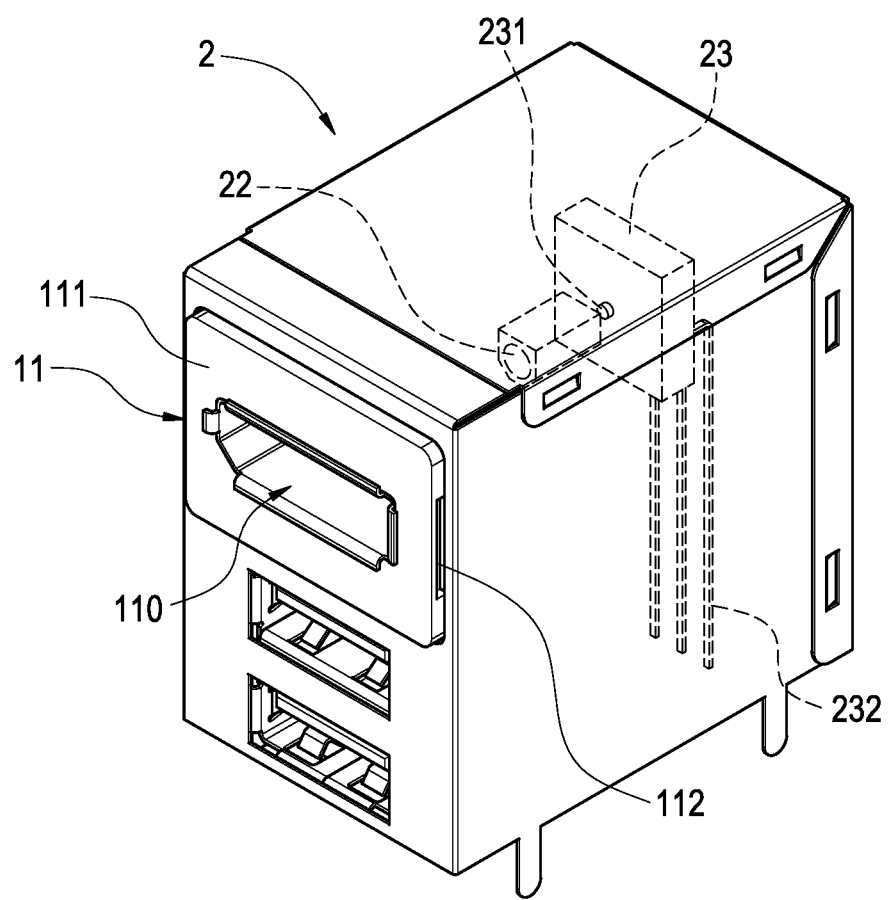
FIG. 10 is a perspective view of the fourth preferred embodiment of the present invention.

With reference to FIGS. 9 and 10 for a perspective exploded view and a perspective view of the fourth preferred embodiment of the present invention respectively, the female terminal 11 and the male terminal 12 of the casing 10 of this preferred embodiment correspond to connectors of the External Serial Advance Technology Attachment (e-SATA) specification, and the quantity of connection terminals 14 corresponds to the quantity of connectors of the e-SATA specification which is equal to seven. The conversion module 1 is electrically coupled to an e-SATA transmission line for receiving an electric signal of the e-SATA specification and converting the electric signal into an optical signal of the e-SATA specification, and then transmitting the optical signal to the corresponding optical connector 2.

Figure 11:
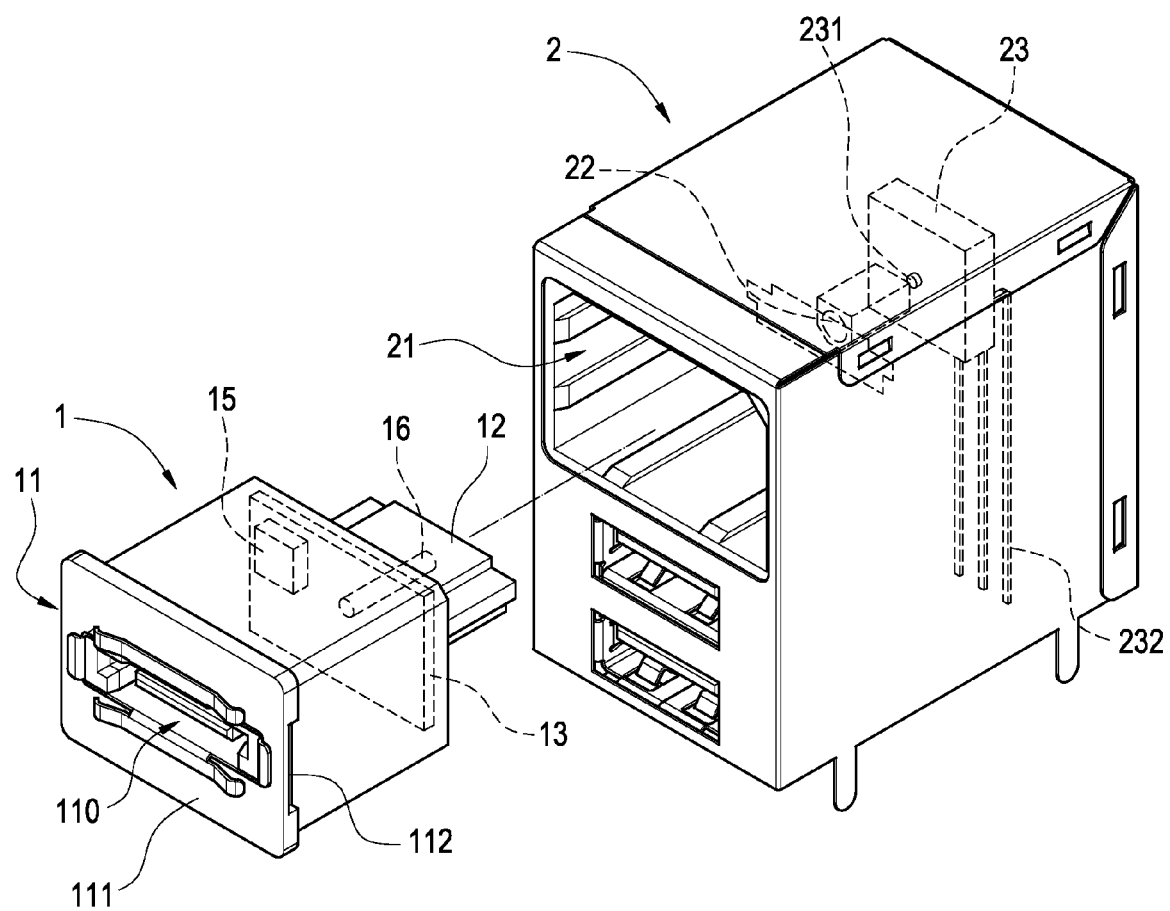
FIG. 11 is a perspective exploded view of a fifth preferred embodiment of the present invention.
Figure 12:
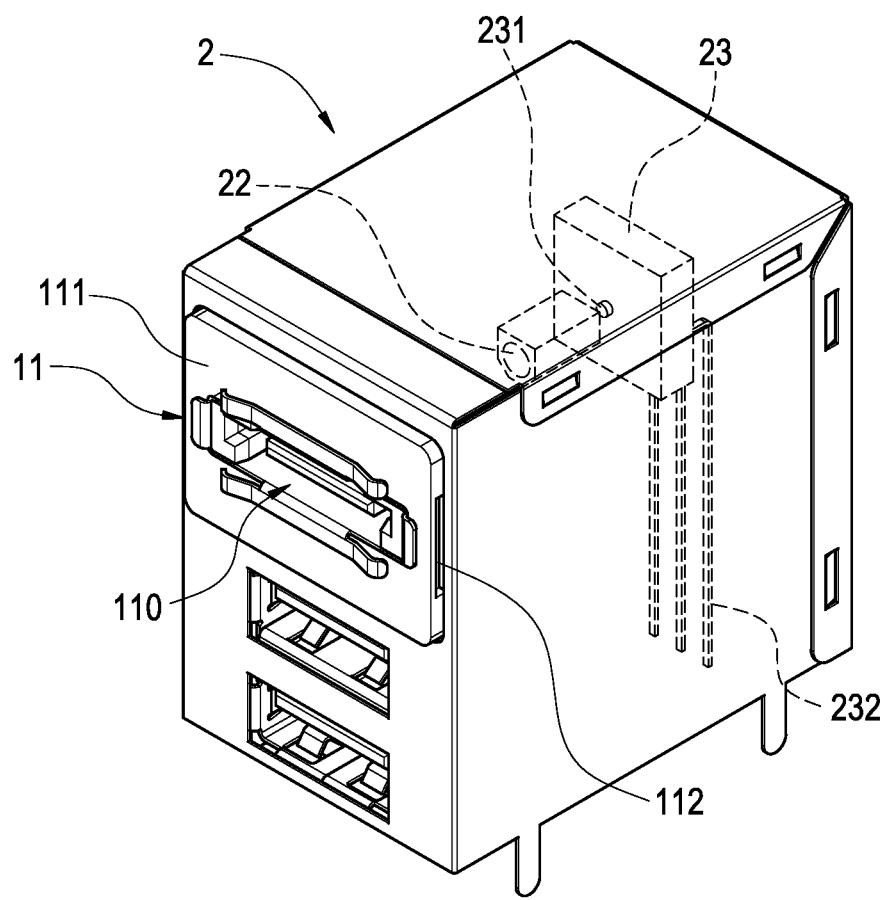
FIG. 12 is a perspective view of the fifth preferred embodiment of the present invention.

With reference to FIGS. 11 and 12 for a perspective exploded view and a perspective view of the fifth preferred embodiment of the present invention respectively, the female terminal 11 and the male terminal 12 of the casing 10 of this preferred embodiment correspond to connectors of the DisplayPort specification, and the quantity of connection terminals 14 corresponds to the quantity of connectors of the DisplayPort specification which is equal to twenty. The conversion module 1 is electrically coupled to a DisplayPort transmission line for receiving an electric signal of the DisplayPort specification and converting the electric signal into an optical signal of the DisplayPort specification, and then transmitting the optical signal to the corresponding optical connector 2.

While the invention has been described by means of specific embodiments, numerous modifications and variations could be made thereto by those skilled in the art without departing from the scope and spirit of the invention set forth in the claims.

What is claimed is:

1. An optoelectronic signal conversion module, for plugging an optical connector, and transmitting an optical signal with an optical component in the optical connector, and the optical connector being electrically coupled to a motherboard through the optical component, the optoelectronic signal conversion module comprising:
    a casing, including a female terminal and a male terminal disposed at a remote end of the female terminal, and the optoelectronic signal conversion module being plugged and coupled to the optical connector through the male terminal, and the female terminal having a jack formed thereon and provided for plugging a male plug of an external transmission line;
    a printed circuit board, installed in the casing;
    a plurality of connection terminals, installed in the casing, and electrically coupled to the printed circuit board, and the transmission line coupled to the jack for receiving an electric signal;
    a signal conversion integrated circuit, installed in the casing, and electrically coupled to the printed circuit board, for converting the received electric signal into an optical signal of the same specification; and
    an optical fiber transmission connector, installed in the casing, and electrically coupled to the printed circuit board, for transmitting the converted optical signal to the optical connector.

2. The optoelectronic signal conversion module of claim 1, wherein the plurality of connection terminals is electrically coupled to the printed circuit board and disposed on a side proximate to the female terminal, and the optical fiber transmission connector is electrically coupled to the printed circuit board and disposed on a side proximate to the male terminal, and the signal conversion integrated circuit is electrically coupled to the printed circuit board and disposed at a middle position between the plurality of connection terminals and the optical fiber transmission connector.

3. The optoelectronic signal conversion module of claim 1, wherein the female terminal and the male terminal disposed on the casing are a female plug and a male plug of the same specification respectively.

4. The optoelectronic signal conversion module of claim 3, wherein the optical connector includes a socket formed thereon, and the optoelectronic signal conversion module is plugged and coupled to the socket of the optical connector through the male terminal, and the female terminal has an end surface greater than an opening of the socket, and when the optoelectronic signal conversion module is plugged and coupled to the optical connector, the end surface of the female terminal is protruded outside the socket.

5. The optoelectronic signal conversion module of claim 4, wherein the female terminal includes at least one notch formed on both sides of the end surface for facilitating the optoelectronic signal conversion module to be unplugged or removed from the socket.

6. The optoelectronic signal conversion module of claim 1, wherein the female terminal and the male terminal disposed on the casing have a specification corresponding to an RJ-45 connector, and the quantity of the connection terminals is equal to eight.

7. The optoelectronic signal conversion module of claim 1, wherein the female terminal and the male terminal disposed on the casing have a specification corresponding to a Universal Serial Bus (USB) connector, and the quantity of the connection terminals is equal to four or nine.

8. The optoelectronic signal conversion module of claim 1, wherein the female terminal and the male terminal disposed on the casing have a specification corresponding to an External Serial Advance Technology Attachment (e-SATA) connector, and the quantity of the connection terminals is equal to seven.

9. The optoelectronic signal conversion module of claim 1, wherein the female terminal and the male terminal disposed on the casing have a specification corresponding to a High Definition Multimedia Interface (HDMI) connector, and the quantity of the connection terminals is equal to nineteen.

10. The optoelectronic signal conversion module of claim 1, wherein the female terminal and the male terminal disposed on the casing have a specification corresponding to a DisplayPort connector, and the quantity of the connection terminals is equal to twenty.

* * * * *